UNITED STATES PATENT OFFICE.

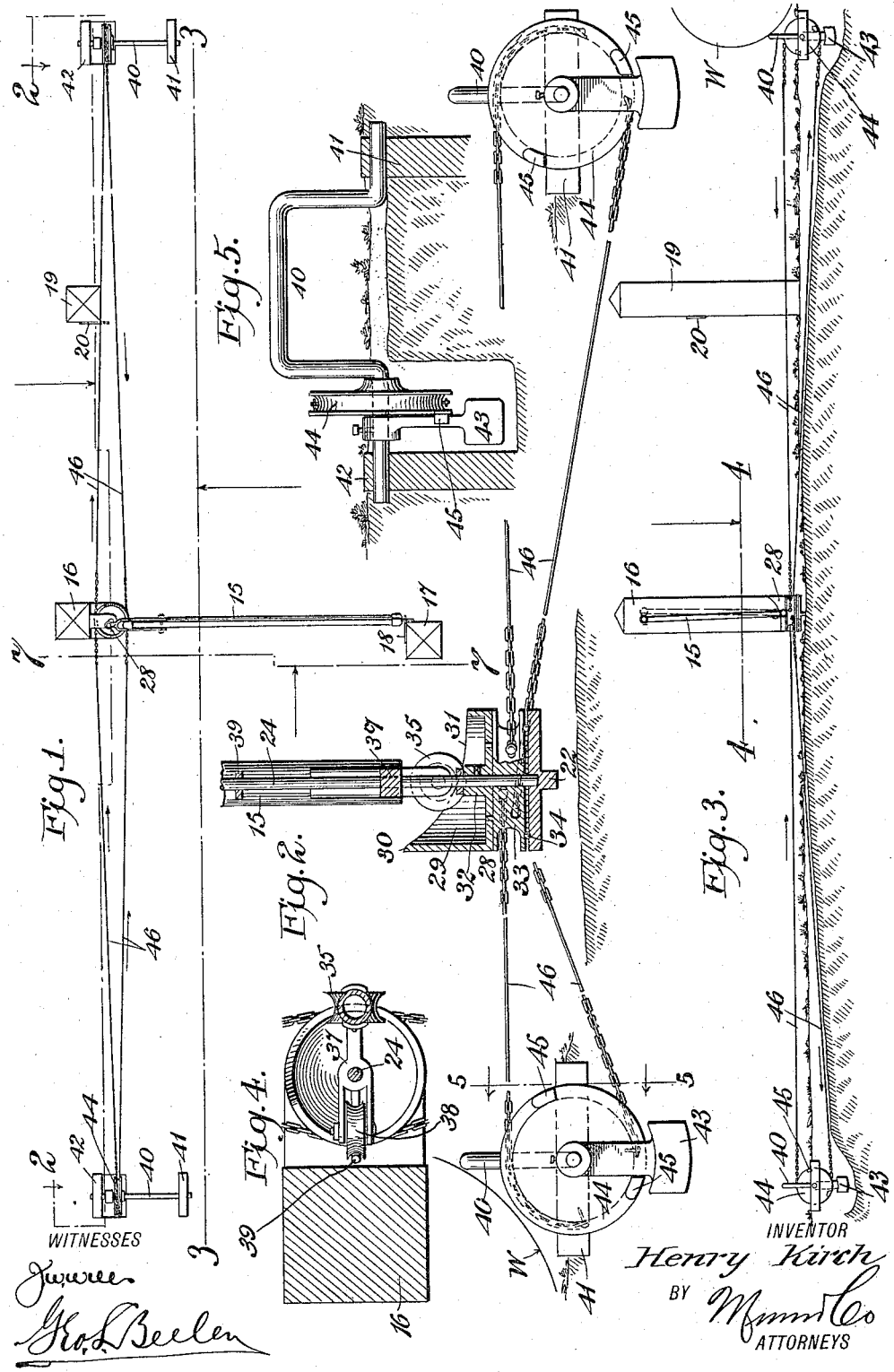

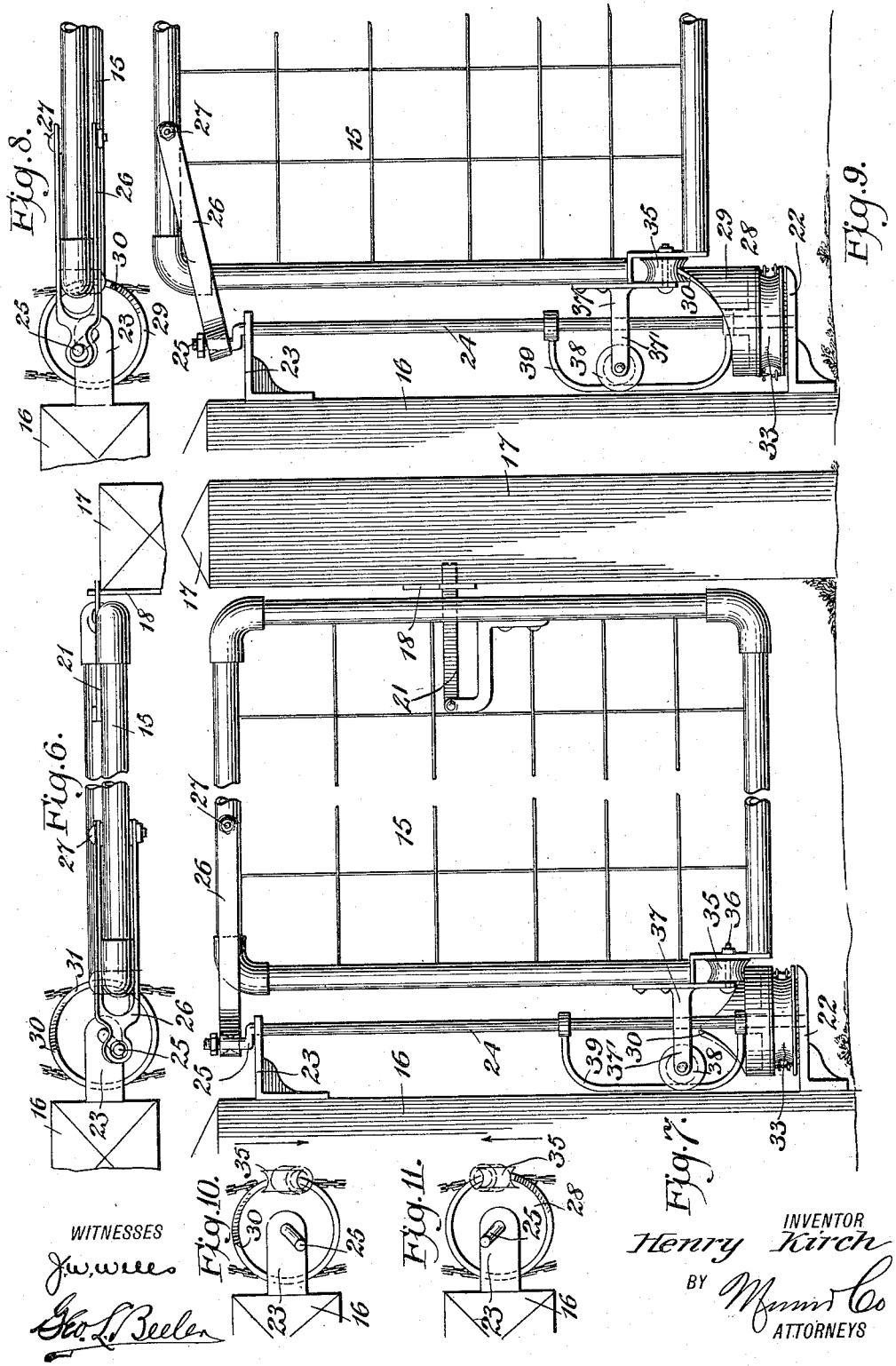

HENRY KIRCH, OF SANTA ROSA, CALIFORNIA.

FARM-GATE.

1,146,716.  Specification of Letters Patent.  Patented July 13, 1915.

Application filed December 2, 1914.  Serial No. 875,112.

*To all whom it may concern:*

Be it known that I, HENRY KIRCH, a citizen of the United States, and a resident of Santa Rosa, in the county of Sonoma and State of California, have invented a new and Improved Farm-Gate, of which the following is a full, clear, and exact description.

This invention relates to fences and has particular reference to gates designed for operation by means of a passing vehicle.

Among the objects of the invention is to improve the operating devices for gates of this character by the provision of a cam mounted upon and rotatable around the vertical axis and constituting an actuator acting first to lift the gate and then to cause the gate to swing open or shut by gravitating down the incline of the cam.

Another object of the invention is to cause the gate to tilt with its top toward the direction in which it is to be moved automatically by gravity.

The foregoing and other objects of the invention will hereinafter be more fully described and claimed and illustrated in the drawings forming a part of this specification in which like characters of reference indicate corresponding parts in all the views, and in which—

Figure 1 is a diagrammatic view in plan of my improved gate mechanism, the gate being in its normally closed position; Fig. 2 is a fragmentary side elevation in section on the line 2—2 of Fig. 1; Fig. 3 is a side elevation as viewed from the line 3—3 of Fig. 1; Fig. 4 is a horizontal sectional detail on the line 4—4 of Fig. 3; Fig. 5 is an elevation of one of the trip members as seen from the line 5—5 of Fig. 2; Fig. 6 is a plan view of the gate in its normal position, this view corresponding to the gate portion of Fig. 1 but on a larger scale; Fig. 7 is a side elevation of the gate as viewed from the line 7—7 of Fig. 1; Fig. 8 is a view corresponding to Fig. 6 but indicating the gate in its elevated position, ready to swing open; Fig. 9 is a view similar to Fig. 7 but corresponding in the position of the gate to Fig. 8; and Figs. 10 and 11 are diagrams showing the relative positions of the actuator and corresponding to Figs. 6 and 8.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings for a description of the mechanism, I show at 15 a gate of any suitable construction adapted to swing open or shut with relation to a main gate post 16. The outer end of the gate is adapted to coöperate with a post 17 which has a catch 18 normally holding the gate closed, and when it swings open the gate is adapted to coöperate in a similar manner with a post 19 having a catch 20. A latch 21 is pivoted to the gate for coöperation with either of said catches.

To the face of the post 16 is secured a base bracket or support 22 near the ground and a bracket 23 is supported above it near the top of the post. A rod 24 is stepped at its lower end in the base 22 and is journaled in vertical alinement with the bearing in the base in the bracket 23. Just above the bracket the rod is bent into a crank 25 upon which is loosely journaled a clevis 26. The clevis is pivoted on a substantially horizontal pivot 27 to the upper portion of the gate. The parallel side members of the clevis embrace the side faces of the gate structure whereby the clevis is limited in its movement around the axis of a pivot 27. The clevis, therefore, constitutes a substantially rigid connector between the gate and the crank 25 with respect to lateral movements of the gate.

At 28 I show what I term an actuator, the same comprising a rotary cam member 29 having a crest 30 and two cam faces 31 extending downwardly from said crest. The cam member 29 comprises also a disk-like base with a hub 32 surrounding and secured to the rod 24 and it is secured rigidly to and is operated positively around the axis of the rod by means of a chain wheel 32 journaled upon antifriction rollers 34 shown in the form of balls upon the base 22. The lower rear portion of the gate is provided with an antifriction roller 35 journaled upon a horizontal pivot 36 coöperating with the upper edge or rim of the cam member 29. In its normal position the gate is supported with the roller 35 on the lower portion of the cam or remote from the crest 30. The gate is connected more directly with the rod 24 by means of a yoke bracket 37 secured to the gate and journaled on the rod and including a yoke 37′ in which is journaled a roller 38 coöperating with a bail 39 journaled upon the rod 24 whereby the friction which might result between the bracket 37 and the rod during the vertical movements of the gate is relieved. It will be understood, therefore, that the connection between the rod 24 and the bracket 37 will be loose enough for all of the movements of the gate with respect to the rod.

At 40 I show trip members, shown best in Fig. 5, each of which is in the form of a double crank journaled at its ends in coaxial bearing supports 41 and 42, the axis of the trip member extending transversely of the roadway and located at any desired distance from the gate so as to insure perfect freedom of movement of the gate without interference of the vehicle or team hitched thereto. The looped portion of the trip member is maintained normally in a vertical position, as shown in Figs. 2 and 3, so as to be engaged by the wheel of a vehicle approaching the gate and whereby the trip member is designed to be depressed toward the gate. A counterweight 43 is secured rigidly to one of the spindles of the trip member and extends normally downwardly or at 180 degrees from the loop of the member. A pulley 44 is journaled loosely upon the spindle adjacent the shank of the counterweight and has a pair of lugs 45 spaced from each other at substantially 90 degrees and adapted to coöperate in alternation with said counterweight shank. It will be noted that the trip members are substantially alike and are connected similarly to the actuator chain wheel 33 by chains, rods, cables, or other suitable connections shown at 46. The connections 46 extend from the pulleys 44 to the chain wheel 33 in such a manner that they will always be moved simultaneously and in the same direction with respect to the actuator. When the wheel W of the vehicle impinges one of the trip members 40 approaching the gate, the member engaged will be depressed to the level of the roadway toward the gate and the counterweight 43 pertaining thereto will be swung upwardly and in a direction away from the gate, causing, through one of the lugs 45 in engagement therewith, the rotation of the adjacent pulley 44 causing the connection 46 leading from the lower edge of the pulley 44 to pull on the chain wheel 33 causing the actuator to rotate through an angle of substantially 90 degrees and thereby causing the crest 30 of the cam to elevate the gate and pass beneath the roller 38 or as shown in Figs. 10 and 11, the latter figure indicating the relative positions of the cam and the roller just after the crest has passed beneath the roller and having elevated the gate. This rotation of the actuator will cause simultaneously a corresponding rotation of the rod 24 and crank 25, the change of position of the crank likewise being indicated in the diagrams of Figs. 10 and 11. Simultaneously, therefore, with the elevation of the gate by the action of the cam, the top of the gate will be thrown over or inclined by virtue of the crank 25 toward the direction in which the gate is to be moved toward the post 19.

The lifting of the gate will cause the disengagement of the latch 21 from the catch 18 on the post 17. The gate, therefore, being unlatched and being near the top of the crest 30 of the cam member will promptly gravitate downwardly and thereby swing open until it reaches the post 19 where it will be latched open. The actuator, however, will remain in the position shown in Fig. 11 until it is subsequently shifted by a positive operation of one of the trip members. The trip members, however, being mounted for limited free movement with respect to the pulleys 44 will both gravitate to normal position as soon as released by the vehicle wheels. After the gate has been opened in the manner stated and the vehicle passes through it and engages the opposite trip member causing it to be swung away from the gate, the counterweight shank will engage and operate the opposite lug 45 and thereby cause the actuator to be rotated in the opposite direction from that above described with the result that the gate will be again lifted by the crest of the cam and caused to be unlatched from the post 19 and allowed to gravitate toward the post 17 to normal position. The tilting of the gate, due to the action of the crank 25, assists in the free swinging movement of the gate in either direction, and this effect is especially advantageous in insuring the latching of the gate closed and promptly starting the gate toward its open position.

Having thus described my invention, I claim as new and desire to secure by Letters Patent:—

1. In a farm gate, the combination of a gate proper, a supporting rod, vertically alined brackets supporting said rod, said rod having a crank at its upper end, a clevis pivotally connected at one end to said crank and pivoted on a substantially horizontal pivot at its other end to the gate, and means to rotate the rod and crank so as to cause the crank to swing past the plane of the gate whereby the gate is tilted at its top.

2. In a device of the character set forth, the combination of a main support, a pair of brackets secured thereto, a rod journaled vertically in said brackets, a cam member surrounding and secured to the rod adjacent the lower bracket, the lower portion of the gate being mounted upon said cam member, a member pivoted on a horizontal pivot to the gate and connecting the upper portion of the gate pivotally to the upper end of said rod, and means to rotate the cam member around the axis of the rod to cause the gate to be lifted and allowed to swing with said pivot member around the axis of said rod.

3. In a device of the character set forth, the combination of a main support, a pair of bearings secured thereto, a vertical rod journaled in said bearings, a double-faced cam member secured to said rod, one portion of the gate being supported upon the upper rim of said cam member at a uniform distance from the axis of the rod, a member pivoted on a horizontal pivot to another portion of the gate and hinged on a vertical pivot to a remote portion of said rod, and means for rotating the cam member by a vehicle approaching and leaving the gate for the purpose of lifting the gate, allowing it to swing both open and closed in succession automatically, one face of the cam being active to lift the gate and the other face serving to cause the gate to swing.

4. The combination with a gate and supporting means therefor, of operating devices including a trip member pivoted on a horizontal axis transverse to the roadway, said supporting devices including an actuator having a double-faced cam member movable around a vertical axis to lift the gate through one cam face, the gate subsequently gravitating down the other face, a pulley journaled loosely upon the axis of the trip member, connections between the trip member and the pulley whereby the pulley is caused to be rotated at times from the trip member, and connections between the pulley and the actuator, substantially as set forth.

5. In a device of the character set forth, the combination of a gate, a vertical pivot rod, connections between the gate and said rod, and means to cause the gate to swing around the axis of the rod, certain of said connections between the gate and the rod including a bracket connected to the gate and slidable along said rod, said bracket including a yoke, an antifriction roller and a bail journaled on said rod and coöperating with said roller, substantially as set forth.

In testimony whereof I have signed my name to this specification in the presence of two subscribing witnesses.

HENRY KIRCH.

Witnesses:
D. R. GALE,
JANET STOKES.

Copies of this patent may be obtained for five cents each, by addressing the "Commissioner of Patents, Washington, D. C."